United States Patent [19]

Wolff

[11] 4,089,985

[45] May 16, 1978

[54] PAPAYA JUICE PRODUCT AND PROCESS

[76] Inventor: H. Ezra Wolff, 779 Kii St., Honolulu, Hi. 96825

[21] Appl. No.: 742,365

[22] Filed: Nov. 15, 1976

Related U.S. Application Data

[63] Continuation-in-part of Ser. No. 522,988, Nov. 11, 1974, abandoned, and a continuation-in-part of Ser. No. 571,310, Apr. 24, 1975, abandoned.

[51] Int. Cl.² ............................................. A23L 2/04
[52] U.S. Cl. ................................. 426/487; 426/488; 426/599; 426/615
[58] Field of Search .............. 426/599, 615, 487, 488, 426/521, 519

[56] References Cited

U.S. PATENT DOCUMENTS

| 2,178,593 | 11/1939 | Matoush | 426/51 |
|---|---|---|---|
| 2,650,165 | 8/1953 | Wahl | 426/63 |
| 2,680,688 | 6/1954 | Moulton | 426/51 |
| 2,858,221 | 10/1958 | Laurie | 426/565 |
| 2,935,407 | 5/1960 | Haman | 426/616 |
| 3,366,488 | 1/1968 | Wagner et al. | 426/599 |

OTHER PUBLICATIONS

Brooks, K., The Forget-About-Meat Cookbook, Rodale Press, Inc., Emmaus, Pa., Apr. 1974.

Primary Examiner—Jeanette M. Hunter
Attorney, Agent, or Firm—William B. Walter

[57] ABSTRACT

An improved papaya juice product is obtained by use of a process in which fresh papaya meat with any of a variety of combinations of water, sugar, honey, salt, citric acid, lemon juice, and ascorbic acid are placed in a high speed blender, covered, homogenized for at least ten minutes at about 195° F (91° C), for at least three minutes for a thorough pasteurization simultaneously with homogenization. Following blending, the material is placed in containers to be held at room temperature, under chilled refrigeration, or frozen.

18 Claims, 2 Drawing Figures

PAPAYA JUICE PRODUCT AND PROCESS

REFERENCE

This is a Continuation-in part of application Ser. Nos. 522,988 filed Nov. 11, 1974 and 571,310 filed Apr. 24, 1975 each of which is now abandoned.

BACKGROUND

Many processes have been developed to remove the bitter tasting and smelling portions of fruit and vegetable juices and to produce a juice of attractive fresh flavor and appearance which contains both liquid and pulp or pomace particles in a form which will not separate upon standing and which can be held in a fresh condition for a reasonable period either in canned, frozen or chilled condition.

In several of such processes the pulp is separated from the liquid, each treated separately, and recombined. Additional steps taught by this prior art include the following:

a. removing the oxygen from the pulp as in Harwell, U.S. Pat. No. 3,301,685;
b. replacing the bitter pulp with good pulp or washing the bitter pulp with water as in Sperti, U.S. Pat. No. 3,385,711;
c. heating only the pulp and not the juice in processing as in Lund, U.S. Pat. No. 3,053,668;
d. heating the homogenized pulp in an open kettle as in Harrell, U.S. Pat. No. 3,118,170; or
e. freezing the pulp and its enzymes separately from the juice and then combining with the juice so as to separate the enzymes from the juice until thawed for use as in Brown et al, U.S. Pat. No. 3,278,315.

In processes employed in recent years to commercially prepare fresh juice from papayas, water is added to papaya meat, sugar, salt, citric acid and ascorbic acid. The mixture is then stirred and placed in containers to be held at room temperature or chilled. The product retains a bitter smell adversely affecting the taste. If not thoroughly stirred, it has a tendency to become lumpy and spoil. Papaya juice as prepared in this method, when left standing either at room temperature or chilled, separates, with the water rising to the top and thus is not attractive in appearance if bottled in transparent or translucent bottles. When in this condition it must be shaken before use.

In U.S. Pat. No. 2,178,593, Matoush describes the manufacture of a stable papaya juice product which incorporates with fluid from the pulp and some pulp, a liquid made from the papaya seeds from the papayas used for the product mixed with lime juice. Following the teaching of this patent, applicant has manufactured such a product, finding as evidence of being a stable product that separation does not occur within a few hours following its manufacture. However, this product had a mustard color instead of the typical papaya bright yellow color and instead of a true papaya taste, a bitter, unpleasant, slightly papaya flavor with a faint taste of lime.

According to James H. Moy, Associate Professor of the Food Science Laboratory of the University of Hawaii, the combination of the seeds and the acid of the lime juice retards bacteria growth and stabilizes the product. The papaya seeds contain benzylglucosinolate. This compound makes isophiocyanate. This compound is beneficial in the seed as it retards growth of bacteria in the papaya. This compound also makes a second product, benzylcynate which can be toxic to humans.

BRIEF SUMMARY OF THE INVENTION

The primary object of this invention is the production of a fruit juice from fresh papaya, which fruit juice will not have a bitter taste or smell, will have a pleasant taste typical of papaya but not too strong a papaya smell, will have the typical papaya meat coloring, will not separate when standing, and which will remain fresh for a long period of time, whether stored at room temperature, chilled or frozen.

The invention lies in the blending of fresh papaya meat for a minimum period of 18 minutes at a very high speed, the high speed blending first raising the temperature of the papaya meat to about 195° F with the blender container covered, secondly holding the temperature of the papaya meat at or above 195° F (91° C) for three minutes with the blender container still covered, and finally continuing the high speed blending for a period of five minutes with the blender container uncovered. If water is added to the papaya meat for blending, the bitter and unpleasant taste and smell of heretofore known papaya juice products are removed by separating and discarding a foam which forms at the top of the blended product from the remainder of the extract. If water is not included, neither the foam nor the undesirable taste and smell is found in the product. An undesirable strong papaya smell is characteristic of other papaya juice products when drinking with the glass held to the drinkers lips. In this invention, the high speed blending of the hot material for the final five minutes with the blender cover removed eliminates this smell.

DETAILED DESCRIPTION OF THE INVENTION

Figure 1:
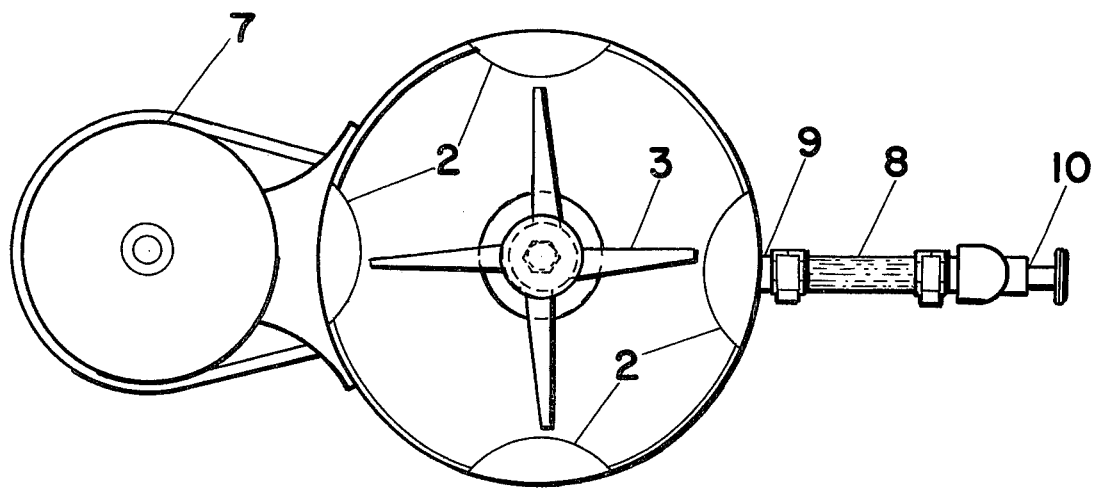
FIG. 1 of the drawings is a plan view of a blender as designed for the process of this invention.
Figure 2:
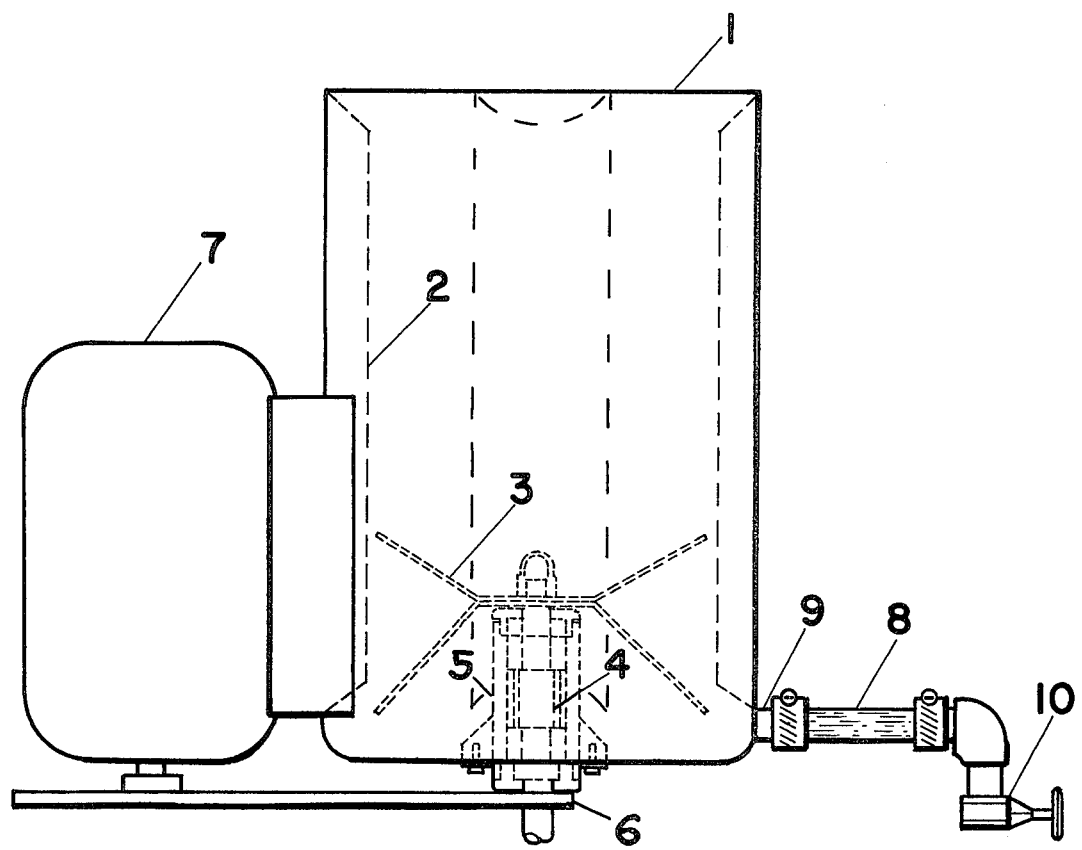
FIG. 2 is a side view of this blender.

Processing of the fruit into juice in the manner of the invention may be accomplished in a blender generally of the design shown in FIGS. 1 and 2. This blender comprises a container 1 having vertical bumpers 2, agitator or impeller cutter blades 3 attached to a shaft 4 supported in a sealed bearing 5, a drive pulley 6 driven by motor 7, a sight glass 8 in the connection between an outlet 9 at the bottom of container 1 and a shutoff valve 10.

The process for making the improved papaya juice using the blender shown in FIGS. 1 and 2 is as follows:

1. The meat is extracted from the papayas by hand or by machine, over-ripe papayas being preferred. The skin can be included if desired, but the seeds are removed and discarded. The extracted meat may be frozen for later use in the process of this invention unless the intended product is a frozen concentrate. Tests have shown that an inferior frozen concentrate results from use of previously frozen papaya meat in the process of this invention.

2. The extracted papaya meat is placed in the blender. Frozen papaya meat is preferably thawed before being placed in the blender.

3. Either no water is added or it may be added preferably in the proportions of three parts by volume of water to one part by volume of fresh papaya meat. The water can be at room temperature, but in the preferred and tested process, the water at the time of adding it to the papaya meat has been heated to a temperature of approximately 160° F (71° C). This will shorten the blending time.

4. The following ingredients may be added for the desired taste per each 12 ounces liquid measure of papaya meat:
   a. 4 tablespoons of sugar or honey;
   b. 1 tablespoon of lemon juice or as a substitute for lemon juice only if not to be subsequently held in chilled or frozen storage, 1 tablespoon of salt plus ⅛ gram or more of citric acid plus 3 grams or less of ascorbic acid. These are approximate amounts.

5. A cover is placed on the blender container to control splash and to limit heat losses from the material during the first phases of blending.

6. The material is blended for at least ten minutes with the blender impeller cutter blades 3 rotated at a sufficiently high speed to add considerable heat by mechanical action to the material and simultaneously homogenize the material until the temperature of the material so processed is raised to about 195° F (91° C). This high speed blending for at least ten minutes insures that all the papaya meat is broken down into fine particles during this phase of the process.

7. The high speed blending is continued for an additional period of at least 3 minutes with the blender covered, the temperature of the material being thus held at or above 195° F (91° C) while being further homogenized.

8. The cutter blades 3 are stopped. If no water has been added to the papaya meat for blending, there will be no foam on the surface of the blended material and it may be removed and placed in containers for storage or use in this condition. If water has been added to the papaya meat for blending, it will be noted that at this time a foam having a bitter smell and taste will be visible at the top of the juice in the blender. Apparently this high speed blending process causes any bitter substances in the mixture with water to rise to the top and become a part of a foam. The foam must therefore be carefully separated from the product and discarded. Any one of a number of methods may be used to separate the undesirable foam from the desirable end product as follows:
   a. Following stopping of the blender blades 3, the shutoff valve 10 is opened to drain the juice into a receiving container or containers. As the draining continues, the sight glass 8 is carefully watched. As soon as foam appears in the sight glass 8, the shutoff valve 10 is closed to insure that none of the foam reaches the receiving container. This is the preferred method.
   b. The shutoff valve 10 is opened following stopping of the blender blades 3 to drain the juice into a receiving container or containers through a fine cheese cloth thus separating the foam from the end product, or
   c. The foam may be skimmed off the top of the blender container before removing the end product.

9. Immediately after blending, the juice can be treated as follows:
   a. placed in cans and sealed, or
   b. cooled and placed in cartons similar to liquid milk cartons and maintained in a chilled condition for sale or use, or
   c. placed in glass containers and maintained at room temperature or chilled, or
   d. if the blended papaya meat into which no water has been added is placed in cans, sealed and frozen, a superior frozen concentrate results. As noted above, the papaya meat for this product may not be previously frozen.

The shelf life of this product is unexpectedly long. Samples kept chilled have remained fresh for 14 months and other samples kept at room temperature in containers which were washed but were neither sterilized nor vacuum sealed remained fresh for two years. The use of citric acid or ascorbic acid in the chilled or frozen products is not recommended, but is optional for the product to be stored at room temperature. Although it is possible to withold adding the ingredients to the papaya meat until after blending, it is preferable to add these ingredients before blending for a thorough mixing. It is also possible to shorten the time required to raise the temperature of the material to 195° 1 F (91° C) during blending by heating the container and controlling its temperature automatically during blending by sensing the skin temperature of the container and using this reading to control the temperature of the contents with steam or water jacketing.

HIGH SPEED BLENDING

The high speed blending as practiced in this invention is sufficiently rapid that the impeller cutter blades 3 add considerable heat to the mixture by the following:
   a. the mechanical action of the blades striking the papaya meat and other ingredients, and passing through this mixture;
   b. internal friction within the rapidly moving material; and
   c. friction of the material as it strikes and passes over the sidewalls of the container 1.

This added heat, as determined by test, is sufficient to raise the temperature of the water which was added at a temperature of 160° F (71° C), and the papaya meat which was added at a room temperature of about 75° F (24° C) to 195° F (91° C) within about 7 minutes and to hold it within a temperature range of 195 to 210° F (91 to 99° C) for the duration of the blending process. This impeller speed is sufficiently high to homogenize the mixture during the blending process. In this homogenizing process, the papaya meat is broken down into very fine particles and the mixture becomes homogeneous. To date for the process I have used a Waring Commercial Blender Model 91-186, Cat. No. HGB-100 having a two quart mixing capacity, a two inch diameter impeller, and two operating speeds, 15,600 and 20,000 rpm. Thus the blade tip speed at that setting is approximately 174.5 feet per second. This speed may be somewhat reduced when spinning under load.

A 30 gallon capacity unit having a 12 inch diameter impeller has been built to determine the optimum impeller speed and other conditions for producing the papaya juice product in commercial quantities. This unit is not yet in operation having suffered many breakdowns in its development, but repeated tests with the Waring two quart blender have shown that the high speed blending providing simultaneous homogenizing, blending and pasteurizing obtains the very desirable product described herein.

PROCESSING TEMPERATURES

Pasteurizing of papaya juice can be accomplished by heating to and holding the juice at temperatures of 149° F (65° C) and above. The minimum length of time required for pasteurizing at any particular temperature is inversely proportional to temperature. Thus pasteurization of papaya juice requires holding it at a temperature of 149° F (65° C) for a minimum of 30 minutes; 7 to 10 minutes at 165° F (74° C); 4 to 5 minutes at 175° F (79° C); or 1 to 2 minutes at 195° F (91° C). It is known that such pasteurization of the papaya juice obtains a shelf life of a few days if refrigerated. Such a period is only marginal to allow for the usual marketing practices. The exceptionally long shelf life which I have obtained by the process of this invention allows an abundance of time for the usual marketing processes and in fact can assist the processor in gearing his activity to variations in availability of fruit.

Although the reason for the long shelf life is not known, the high speed blending causing thorough homogenizing at the elevated temperatures for about 20 minutes or more as described herein does result in a very good tasting, highly nutritious, natural fruit juice of very long shelf life.

I claim:

1. The process of preparing a liquid extract of fresh papaya which comprises the following steps:
   a. extraction of meat from fresh papayas, separating out and discarding the seeds and skins thereof;
   b. placing the extracted papaya meat without added water in a blender having rotatable impeller cutter blades in a blender container;
   c. placing a cover on the blender container;
   d. homogenizing the papaya meat in the blender by rotating the impeller cutter blades for at least 10 minutes at a sufficiently high speed that considerable heat is added to the papaya meat as it is being homogenized so that the added heat raises the temperature of the homogenized papaya meat to a temperature of about 195° F;
   e. continuing to rotate the impeller cutter blades at high speed for at least three minutes with the cover on thus holding the temperature of the material being homogenized at a temperature of about 195° F or higher thus insuring thorough pasteurization during homogenizing;
   f. removing the cover from the blender container and continuing the high speed blending for at least five minutes with the cover removed; and
   g. stopping the high speed blending and removing the homogenized and pasteurized material from the blender and placing it in a container.

2. The process as claimed in claim 1 in which the papaya skin is included with the papaya meat when the papaya meat is placed in the blender.

3. The process of preparing a liquid extract of fresh papaya as claimed in claim 1 also comprising placing in the blender container, before homogenizing, previously extracted, frozen and thawed papaya meat.

4. The process of preparing a liquid extract of fresh papaya as claimed in claim 2 also comprising placing in the blender container, before homogenizing, previously extracted, frozen and thawed papaya meat.

5. The process of preparing an acqueous liquid extract of fresh papaya which comprises the following steps:
   a. extraction of meat from fresh papayas, separating out and discarding the seeds and skins thereof;
   b. placing the extracted fresh papaya meat and water in a blender having rotatable impeller cutter blades in a blender container;
   c. placing a cover on the blender container;
   d. homogenizing the papaya meat and water in the blender by rotating the impeller cutter blades for at least 10 minutes at a sufficiently high speed that considerable heat is added to the papaya meat as it is being homogenized so that the added heat reaises the temperature of the homogenized material to a temperature of about 195° F;
   e. continuing to rotate the impeller cutter blades at high speed for at least three minutes with the cover on thus holding the temperature of the material being homogenized at a temperature of about 195° F or higher thus insuring thorough pasteurization during homogenizing;
   f. removing the cover from the blender container and continuing the high speed blending for at least five minutes with the cover removed; and
   g. stopping the high speed blending and separating the extract from the foam formed at the top of the blended material, placing the extract minus the foam into a container.

6. The process as claimed in claim 5 in which the water to be added is heated before being placed in the blender.

7. The process as claimed in claim 5 in which separation of the foam from the remainder of the extract is accomplished by draining the blended material through a sightglass connecting an outlet at the bottom of the blender container with a shutoff valve until foam is seen in the sightglass and then closing the shutoff valve.

8. The process as claimed in claim 5 in which the papaya skin is included with the papaya meat when the papaya meat is placed in the blender with the papaya meat and water.

9. The process as claimed in claim 5 also comprising placing in the blender container, before homogenizing, previously extracted, frozen and thawed papaya meat.

10. The process as claimed in claim 8 also comprising placing in the blender container, before homogenizing, previously extracted, frozen and thawed papaya meat.

11. The process of preparing a frozen fruit juice base of fresh papaya which comprises the following steps:
   a. extraction of meat from fresh papayas, separating out and discarding the seeds and skins thereof;
   b. placing the extracted fresh papaya meat without added water in a blender having rotatable impeller cutter blades in a blender container;
   c. placing a cover on the blender container;
   d. homogenizing the papaya meat in the blender by rotating the impeller cutter blades for at least 10 minutes at a sufficiently high speed that considerable heat is added to the papaya meat as it is being homogenized so that the added heat raises the temperature of the homogenized papaya meat to a temperature of about 195° F;
   e. continuing to rotate the impeller cutter blades at high speed for at least three minutes with the cover on thus holding the temperature of the material being homogenized at a temperature of about 195° F or higher thus insuring thorough pasteurization during homogenizing;

f. removing the cover from the blender container and continuing the high speed blending for at least five minutes with the cover removed;

g. removing the homogenized and pasteurized extract from the blender and placing it in a container; and h. placing the filled container in frozen storage.

12. The process as claimed in claim 11 in which the papaya skin is included when the papaya meat is placed in the blender with the papaya meat.

13. A stable papaya juice having the flavor of fresh papaya with the absence of bitter taste or smell which is a product of the process of claim 1.

14. A stable papaya juice having the flavor of fresh papaya with the absence of bitter taste or smell which is a product of the process of claim 2.

15. A stable papaya juice having the flavor of fresh papaya with the absence of bitter taste or smell which is a product of the process of claim 11.

16. A stable papaya juice having the flavor of fresh papaya with the absence of bitter taste or smell which is a product of the process of claim 12.

17. The process of preparing a liquid extract of fresh papaya as claimed in claim 1 in which the extracted meat from fresh papayas is placed in frozen storage, removed from frozen storage and thawed before being placed in the blender.

18. The process of preparing a liquid extract of fresh papaya as claimed in claim 5 in which the extracted meat from fresh papayas is placed in frozen storage, removed from frozen storage and thawed before being placed in the blender.

* * * * *